(12) United States Patent
Rabinovich et al.

(10) Patent No.: US 10,615,898 B2
(45) Date of Patent: Apr. 7, 2020

(54) SYSTEM AND METHOD OF CLOCK MANAGEMENT IN A PACKET DATA NETWORK

(71) Applicant: ADVA Optical Networking SE, Martinsried/Munich (DE)

(72) Inventors: Michael Rabinovich, Modiin (IL); Moshe Tofef, Netanya (IL)

(73) Assignee: ADVA Optical Networking SE, Martinsried/Munich (DE)

( * ) Notice: Subject to any disclaimer, the term of this patent is extended or adjusted under 35 U.S.C. 154(b) by 116 days.

(21) Appl. No.: 15/923,241

(22) Filed: Mar. 16, 2018

(65) Prior Publication Data

US 2018/0287725 A1    Oct. 4, 2018

(30) Foreign Application Priority Data

Mar. 30, 2017   (EP) ..................................... 17163891

(51) Int. Cl.
   *H04J 3/06*   (2006.01)

(52) U.S. Cl.
   CPC .......... *H04J 3/0667* (2013.01); *H04J 3/0673* (2013.01)

(58) Field of Classification Search
   None
   See application file for complete search history.

(56) References Cited

U.S. PATENT DOCUMENTS

| 5,761,197 | A | 6/1998 | Takefman |
| 5,943,480 | A | 8/1999 | Neidhardt |
| 6,822,965 | B1 | 11/2004 | Johnson et al. |
| 7,143,166 | B1 | 11/2006 | Brassil |
| 7,839,897 | B2 * | 11/2010 | Radulescu ............ H04J 3/0664 370/503 |

(Continued)

FOREIGN PATENT DOCUMENTS

| WO | 02063798 A1 | 8/2002 |
| WO | 11124113 A1 | 10/2011 |
| WO | 12167807 A1 | 12/2012 |

OTHER PUBLICATIONS

Lu Huang, Compensation for Asymmetry of Physical Line.

(Continued)

*Primary Examiner* — Gregory B Sefcheck
(74) *Attorney, Agent, or Firm* — Wiggin and Dana LLP; Gregory S. Rosenblatt; Rikesh P. Patel (57) ABSTRACT

There is provided a method of clock management in a packet data network (PDN) implementing a time-transfer protocol and a clock controller configured to operate therein. The clock controller is configured to: obtain topology data informative of a master clock node and a slave clock node constituting end points of a PTP path in the PDN and further informative of at least part of transit nodes of said PTP path; periodically obtain data informative of queue size and link rate characterizing, during a collection period, the at least part of transit nodes in master-slave (MS) and slave-master (SM) directions; for each collection period, use the obtained queue-related data to estimate queue-induced delay asymmetry of the PTP path; and send the estimated value of queue-induced delay asymmetry to the slave node, the estimated value to be used by a clock residing on the slave node as delay asymmetry correction parameter.

16 Claims, 5 Drawing Sheets

(56) References Cited

U.S. PATENT DOCUMENTS

| | | | | |
|---|---|---|---|---|
| 8,095,615 | B2* | 1/2012 | Briscoe | G06F 1/12 |
| | | | | 331/174 |
| 8,171,152 | B2* | 5/2012 | White | H04L 43/0858 |
| | | | | 709/231 |
| 8,416,812 | B2* | 4/2013 | Radulescu | H04J 3/0667 |
| | | | | 370/503 |
| 8,417,934 | B2* | 4/2013 | Kondapalli | H04L 63/0428 |
| | | | | 713/150 |
| 8,446,896 | B2* | 5/2013 | Bedrosian | H04J 3/0697 |
| | | | | 370/348 |
| 8,964,921 | B2* | 2/2015 | Kure | H04N 21/44004 |
| | | | | 375/355 |
| 8,971,356 | B2* | 3/2015 | Geva | H04J 3/0667 |
| | | | | 370/503 |
| 9,059,811 | B2* | 6/2015 | Huang | H04J 3/0664 |
| 9,204,408 | B2* | 12/2015 | Hirota | H04L 47/56 |
| 9,264,132 | B2* | 2/2016 | Zampetti | H04B 10/07 |
| 9,391,768 | B2* | 7/2016 | Roberts | H04B 10/27 |
| 9,584,217 | B2* | 2/2017 | Bottari | H04B 10/0775 |
| 9,665,121 | B2* | 5/2017 | Aweya | G06F 1/150 |
| 9,813,175 | B2* | 11/2017 | Bottari | H04J 3/0641 |
| 9,819,541 | B2* | 11/2017 | Garg | H04L 41/0668 |
| 9,973,292 | B2* | 5/2018 | Aweya | H04J 3/0661 |
| 10,075,253 | B2* | 9/2018 | Olofsson | H04J 3/0673 |
| 10,142,088 | B2* | 11/2018 | Liu | H04J 3/0664 |
| 10,306,268 | B2* | 5/2019 | Kure | H04N 19/30 |
| 2002/0009080 | A1 | 1/2002 | Engstrand | |
| 2003/0134644 | A1 | 7/2003 | Reed | |
| 2007/0008993 | A1* | 1/2007 | Cha | H04J 3/0664 |
| | | | | 370/509 |
| 2007/0147265 | A1 | 6/2007 | Eidson | |
| 2010/0085989 | A1 | 4/2010 | Belhadj et al. | |
| 2010/0329125 | A1 | 12/2010 | Roberts et al. | |
| 2013/0209096 | A1 | 8/2013 | Le Pallec | |
| 2014/0086065 | A1* | 3/2014 | DeCusatis | H04L 41/0896 |
| | | | | 370/242 |
| 2014/0226984 | A1 | 8/2014 | Roberts | |
| 2014/0270805 | A1 | 9/2014 | Mani | |
| 2015/0092794 | A1 | 4/2015 | Aweya et al. | |
| 2016/0170437 | A1 | 6/2016 | Aweya et al. | |
| 2017/0046298 | A1* | 2/2017 | Yu | G06F 13/4226 |
| 2017/0063481 | A1* | 3/2017 | Pauwels | H04J 3/0673 |
| 2018/0013508 | A1* | 1/2018 | Rabinovich | H04J 3/0667 |
| 2018/0070126 | A1* | 3/2018 | Martel | H04L 65/4084 |
| 2018/0145781 | A1* | 5/2018 | Chaloupka | H04J 3/0667 |

OTHER PUBLICATIONS

Arifur Rahman, Delay Asymmetry Correction Model for IEEE 1588 Synchronization Protocol.

Chaloupka, Z., Alsindi, N., & Aweya, J., Clock synchronization over communication paths with queue-induced delay asymmetries (2014), IEEE Communications Letters, 18(9), 1551-1554.

Lévesque, M., & Tipper, D., Improving the PTP synchronization accuracy under asymmetric delay conditions (2015), 2015 IEEE International Symposium on (pp. 88-93).

* cited by examiner

PRIOR ART

SYSTEM AND METHOD OF CLOCK MANAGEMENT IN A PACKET DATA NETWORK

TECHNICAL FIELD

The presently disclosed subject matter relates to managing a telecommunication network and, more particularly, to clock management in a packet-data network (PDN).

BACKGROUND

Proper operation of a telecommunication network requires time and/or frequency synchronization between various entities therein. Synchronization can be achieved, for example, by exchange timing information (time-transfer) across the network. One of the protocols for exchanging timing information over a packet data network is the IEEE 1588 Precision Time Protocol (PTP) usable for frequency and phase synchronization. Another example of timing protocol is Network Time Protocol (NTP). Both protocols are in-band protocols encapsulating time stamps into data packets. While in the NTP case the network nodes receive synchronization data in a pull mode (from a server or from several peer nodes), in the PTP cases, slave clock nodes (referred to hereinafter also as slave nodes), receive synchronization data from a master clock node (referred to hereinafter also as master node) in a push mode.

For purpose of illustration only and unless specifically stated otherwise, the following description is provided for PTP-based synchronization. Those skilled in the art will readily appreciate that the teachings of the presently disclosed subject matter are, likewise, applicable to other time-transfer protocols and/or procedures that are usable for the exchange of time-related information in a packet data network.

Through exchange of PTP packets, which include timestamps carried inside, PTP enables synchronization between a master clock node, which has access to an accurate time source (e.g. Global Positioning System) and slave clock nodes having less accurate clocks. Timestamps are usable for frequency and phase recovery between the clocks. For example, the phase recovery at the slave clock node is based on measurement of the round trip delay to the master node, such measurement based on the time stamps. In a case of symmetric delay, the one way delay can be estimated as half of the round trip. However, real PDNs are not symmetric and in order to estimate the precise time using the roundtrip delay, it is necessary to compensate asymmetry (if any) between such delays in forward and backward directions.

General Description

Problems of compensation of asymmetric delays when exchanging timing information between master and slave clocks have been recognized in the conventional art. A static asymmetry between transmission (MS) and receiving (SM) directions in a communication path between a master clock node and a slave clock node can be compensated by using measured or estimated correction parameters, and/or such may be duly calibrated beforehand.

In accordance with certain aspects of the presently disclosed subject matter, there is provided a method of clock management in a PDN with dynamic asymmetry caused by queue-induced delays on communication paths. The method comprises: obtaining, by the clock controller, topology data informative of a master clock node and a slave clock node constituting end points of a PTP path in the PDN and further informative of at least part of transit nodes of said PTP path; periodically obtaining by the clock controller data informative of queue size and link rate characterizing, during a collection period, the at least part of transit nodes in master-slave (MS) and slave-master (SM) directions, thereby giving rise to queue-related data; for each collection period, using the obtained queue-related data to estimate, by the clock controller, queue-induced delay asymmetry of the PTP path; and sending by the clock controller the estimated value of queue-induced delay asymmetry to the slave node, the estimated value to be used by a clock residing on the slave node as a delay asymmetry correction parameter.

In accordance with further aspects, estimating queue-induced delay asymmetry for a collection period can comprise: for each node of the at least part of transit nodes, processing a plurality of samples informative of queue size and link rate at MS and/or SM directions and received during the collection period, thereby calculating a corresponding plurality of sample delays in MS and/or SM directions; for each node of the at least part of transit nodes, selecting, among the plurality of sample delays calculated for a given direction, minimal sample delay values; summarizing the minimal sample delay values over all nodes, of the at least part of transit nodes, located on the PTP path in MS direction and summarizing the minimal sample delay values over all nodes, of the at least part of transit nodes, located on the PTP path in the SM direction; and estimating queue-induced delay asymmetry of the PTP path as a half of the difference between the summaries of minimal sample delay values obtained in MS and SM directions.

For transit nodes located on the PTP path in a given direction, a sampled delay can be calculated as a ratio between respectively sampled queue size and link rate in the given direction.

In accordance with further aspects, the clock controller can send to the slave node the values of queue-induced delay asymmetry estimated in each of the collection periods. Alternatively, the clock controller can send to the slave node only estimated values of queue-induced delay asymmetry which exceed a predefined threshold.

In accordance with further aspects, the clock controller can obtain topology data and/or queue-related data from a network management system or SDN (Software Defined Network) controller operatively connected to the nodes and to the clock controller.

In accordance with further aspects, the clock controller can calculate a variation of values of queue-induced delay asymmetry estimated during a predefined number of consecutive collection periods, and can change the duration of collection if the variation does not fit a predefined criterion.

In accordance with other aspects of the presently disclosed subject matter, there is provided a clock controller configured to operate in a packet data network (PDN) comprising a plurality of nodes and implementing a time-transfer protocol, the clock controller operatively connected to at least part of the of the nodes of the plurality of nodes, wherein the clock controller is further configured to operate as detailed above.

In accordance with other aspects of the presently disclosed subject matter, there is provided a program product implemented on a non-transitory computer usable medium and comprising computer readable program code for performing the method as detailed above.

Among advantages of certain embodiments of presently disclosed subject matter is improving the slave clock accuracy by compensating queue-induced delay asymmetry. Among further advantages of certain embodiments of the presently disclosed subject matter is enabling improved slave clock accuracy with no need in using "lucky" packets which may be unavailable when network nodes are heavily loaded. Among yet further advantages of certain embodiments of the presently disclosed subject matter is capability to improve slave clock accuracy even for end-to-end secured communication paths between the master and slave clocks.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "sending", "receiving", "comparing", "generating", "correcting", "matching", "calculating", "using" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the clock controller and respective parts thereof disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein can be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages can be used to implement the teachings of the presently disclosed subject matter as described herein.

Figure 1:
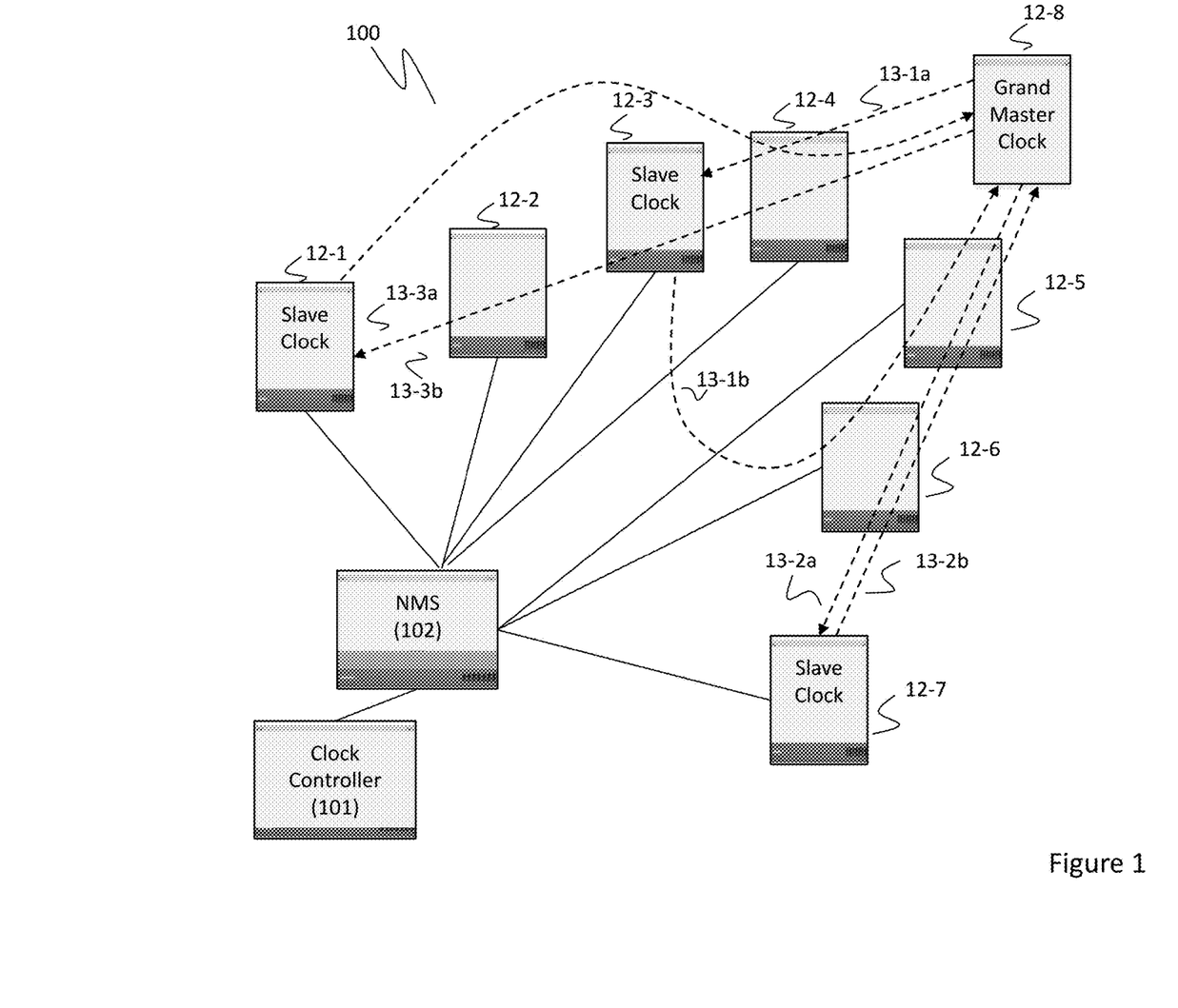
FIG. 1 illustrates a generalized schematic architecture of an exemplary packet data network implementing the Precision Time Protocol (PTP) and configured in accordance with certain embodiments of the presently disclosed subject matter.

Bearing this in mind, attention is drawn to FIG. 1 schematically illustrating an exemplary communication network (e.g. packet-based backhaul networks, enterprise Ethernet networks, etc.) 100 including a plurality of interconnected nodes denoted as 12-1-12-8 and implementing the Precision Time Protocol (PTP). Some of the plurality of interconnected nodes (illustrated as 12-1, 12-3, 12-7 and 12-8) bear a clock operating as either a source of (master) or destination for (slave) a synchronization reference. A clock operating in master mode is referred to hereinafter as a master clock residing on the node, and a clock operating in slave mode is referred to hereinafter as a slave clock residing on the node. The rest of the nodes (illustrated as 12-2, 12-4, 12-5 and 12-6) of the plurality of interconnected nodes are not PTP-enabled. The clock-bearing nodes constitute a clock distribution network operating on top of the communication network 100 which may have ring, bus, tree, star, or mesh topology, or a combination of different topologies.

In accordance with IEEE 1588 standards, clock distribution in the network 100 is implemented in a hierarchical manner. A hierarchical structure of clock distribution can be dynamically configured by algorithms enabling selection of the best clock. For example, dynamic configuration of clock hierarchy and selecting a grandmaster can be provided by the Best Master Clock (BMC) algorithm defined by IEEE 1588-2008 and usable for building a clock hierarchy and selecting the grandmaster. The BMC algorithm uses announce messages to compare data (e.g. clock quality, priority, etc.) characterizing two clocks to determine which data characterizes the better clock, and performs a distributed selection of the best candidate clock. A synchronization master can be selected for each of the network segments in the system. A root timing reference clock (referred to hereinafter as "grandmaster") transmits synchronization information to the clocks residing on its network segment.

For purpose of illustration, node 12-8 is currently configured to be the source of a synchronization reference, i.e. to serve as PTP grandmaster and to provide the root timing reference in the entire network. Nodes 12-1, 12-3 and 12-7 are currently configured to be the destinations of a synchronization reference, i.e. to operate as PTP slave nodes.

Figure 2:
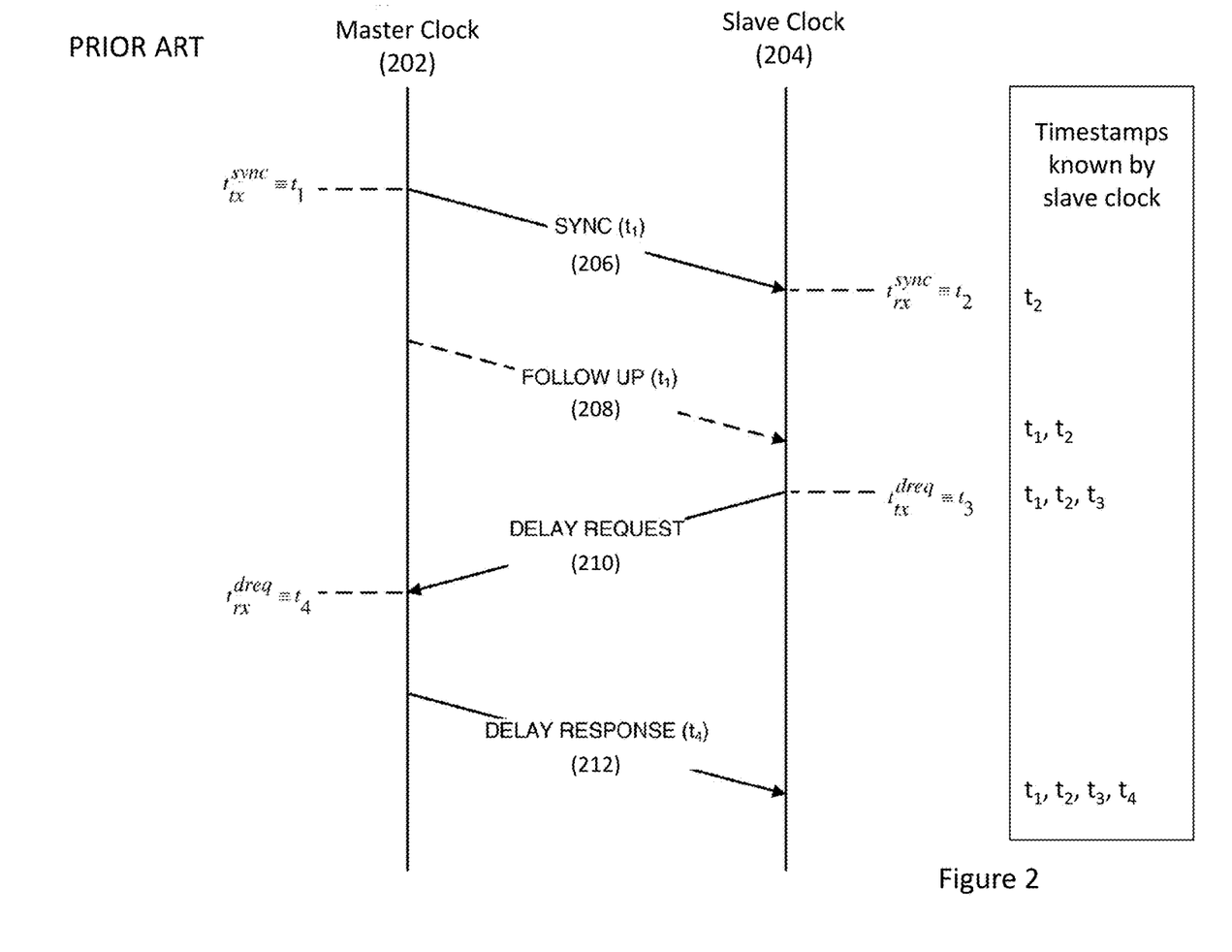
FIG. 2 illustrates a clock synchronization procedure in accordance with the PTP protocol as known in prior art.

Referring to FIG. 2, there is illustrated a simplified sequence of message exchange between the master clock and one of slave end-nodes when operating the PTP protocol as known in prior art. FIG. 2 provides a pictorial representation of SYNC, SYNC FOLLOW UP, DELAY RESPONSE, and DELAY REQUEST messages and the associated timing information that are exchanged between a master clock 202 and a slave clock 204.

In addition to exchange of synchronizing messages detailed below with reference to FIG. 2, PTP supports other synchronizing messages (e.g. for peer-to-peer synchronization). PTP also supports other announce and signaling messages usable to configure and maintain the PTP-based clock distribution. For example, best master clock algorithm (BMCA) uses PTP announce messages to determine the configuration of the master-slave hierarchy in a network, and to select the grandmaster.

SYNC message 206 comprises, embedded by the master clock timestamp, $t_{tx}^{sync}$ (referred to hereinafter also as $t_1$), which represents the time at which the transmission of the SYNC message 206 was initiated. The SYNC message 206 is received at a certain time, $t_{rx}^{sync}$ (referred to hereinafter also as $t_2$), by the receiving slave clock 204. Since $t_2$ is measured by the slave clock, the value of $t_2$ can be less accurate than $t_1$ measured by the master clock. Equation (1) expresses the relationship between the time values $t_1$ and $t_2$ in terms of the network transit delay ($\Delta t_{delay}^{sync}$) and the time offset ($\Delta t_{offset}$) between the slave clock measurement and the master clock measurement:

$$t_2 = t_1 + \Delta t_{delay}^{sync} + \Delta t_{offset} = t_1 + \Delta t^{sync} \qquad (1).$$

Optionally (e.g. when the master clock hardware does not support inclusion of timestamp $t_1$ in the SYNC message 206), a highly accurate hardware measurement of the timestamp, $t_1$, can be transferred not within the sync packet itself, but within a separate SYNC FOLLOW UP message 208.

The slave clock sends to the master clock DELAY REQUEST message 210 informative of measured by the slave clock transmission time $t_{tx}^{dreq}$ (referred to hereinafter also as $t_3$). The master clock notes the reception time, $t_{rx}^{dreq}$ (referred to hereinafter also as $t_4$) of the DELAY REQUEST message 210; it generates, in response, DELAY RESPONSE message 212 and transmits the DELAY RESPONSE message 212 to the slave clock. The DELAY RESPONSE message 212 provides the timing information $t_4$ back to the slave clock. Similar to Equation (1), the relationship between time values $t_3$ and $t_4$ can be expressed as:

$$t_4 = t_3 + \therefore t_{delay}^{dreq} \Delta t_{offset} = t_3 + \Delta t^{dreq} \qquad (2).$$

The values of $t_1$, $t_4$ (collectively referred to also as master timestamps) transmitted to the slave clock 204 as part of message exchange and values $t_2$ and $t_3$ (collectively referred to also as slave timestamps) generated by the slave clock 204 are stored in a memory location accessible by the slave clock 204. The slave clock further uses the collected timestamps and generates clock-recovery data usable for clock (i.e. frequency and/or phase) recovery.

Equations (1) and (2) can produce the slave clock offset $\Delta t_{offset}$ indicative of time difference between the slave clock and the master clock. Further, the calculated clock offset is directly applied to the time stamp of the slave clock as follows: Slave's New Time Stamp=Slave's Old Time Stamp−$\Delta t_{offset}$ (3). Mean propagation time can be calculated as:

$$\text{Mean Propagation Time} = ((t2-t1)+(t4-t3))/2 = ((t2-t3)+(t4-t1))/2 \qquad (4)$$

The above computation of an offset and the propagation time assumes that the master-to-slave and the slave-to-master propagation times are equal. However, in practice, an asymmetry in propagation time introduces an error into the computed value of the clock offset. The computed mean propagation time also differs from the actual propagation times due to asymmetry.

Asymmetric delay is one of the major sources of error when transferring time from one clock to another. Asymmetric delays can be caused by different physical paths (e.g. due to different length of $T_x$ and $R_x$ fibers, dispersion compensation modules, wavelength dependent delays, etc.) used for the master-to-slave and the slave-to-master directions. Such asymmetry is substantially static and can be duly calibrated and/or compensated by one or more techniques known in the art (e.g. defined by IEEE 1588v2 PTP, clock filter algorithm for NTP specified in RFC5905 by IETF, etc.).

Further to static asymmetry between directions of communication paths between master clock and slave clocks, packet data networks are characterized by dynamic asymmetry. One of the major sources of such is associated with queue-induced delays experienced by the timing packets at equipment residing on the transit nodes (e.g. routers, switches) between the clocks.

Queue-induced delay can be defined as a difference between the time a packet is assigned to a respective queue for transmission and the time it starts being transmitted from a node. Queue-induced delays are dependent on data traffic load within a node and implemented traffic management scheme.

For purpose of illustration only, the following description is provided for simplified traffic management model with single queue per egress traffic port. Those skilled in the art will readily appreciate that the teachings of the presently disclosed subject matter are, likewise, applicable to multiple queues. By way of non-limiting example, for multiple queues traffic management scheme PTP packets queue-induced delays can be estimated assuming that PTP packets are assigned to the highest priority queue. In this case the delay can be calculated as queue size multiplied by queue shaping rate.

Asymmetry, due to queue-induced delays, can be in the order of microseconds or much more, while the desired level of time accuracy and time stability in a communication network can be in the order of hundreds of nanoseconds.

Referring back to FIG. 1, there are illustrated exemplified master clock/slave clock communication paths. Unless specifically stated otherwise, a communication path between a master node and a slave node is referred to hereinafter as a PTP path. PTP path 13-1a from master clock node 12-8 to slave clock node 12-3 passes through transit node 12-4; and, in the opposite direction, PTP path 13-1b from slave clock node 12-4 to master clock node 12-8 passes transit nodes 12-6 and 12-5. PTP path 13-3a from master clock node 12-8 to slave clock node 12-1 passes through transit nodes 12-2, 12-3 and 12-4; and, in the opposite direction, PTP path 13-3b from slave clock node 12-1 to master clock node 12-8 passes through transit node 12-4. PTP path 13-2a from master clock node 12-8 to slave clock node 12-7 and PTP path 13-2b from slave clock node 12-7 to master clock node 12-8 pass through the same transit nodes 12-5 and 12-6.

All nodes in the network 100 are operatively coupled to a network management system 102. The network management system (NMS) is configured to communicate with the network nodes (e.g. via SNMP, Netconf or any other suitable protocol), and to gather thereof information related to performance and configuration of the nodes (including clock-related information). NMS can be configured to process the gathered information to obtain network topology, including topology of time distribution in the network. By way of non-limiting example, NMS can periodically poll the nodes (e.g. for clock statuses, forwarding tables, etc.) and/or get notifications from the nodes responsive to the configuration changes.

The network nodes can be further configured to respectively maintain databases comprising information indicative of queue sizes and link rates, and NMS can be configured to gather such information from the nodes.

In accordance with certain embodiments of the presently disclosed subject matter, network 100 further comprises a clock controller 101 operating in conjunction with NMS 102. The clock controller can be a separate network entity operatively connected to NMS, or can be, at least partly, integrated with NMS. By way of non-limiting example, communication between NMS and clock controller can be provided via REST API.

As will be further detailed with reference to FIGS. 3-4, clock controller 101 is configured to periodically obtain data informative of queue size and link rate of at least part of transit nodes of a given PTP path, estimate queue-induced delay asymmetry, and to send the respective estimated values of queue-induced delay asymmetry as correction parameters to the slave clock being the destination node of the given PTP path.

It is noted that increasing a portion of transit nodes providing queue-size and link-rate related information to the clock controller increases accuracy of asymmetry compensation of a given PTP path. Preferably (but not necessary so), the clock controller can obtain such information from all transit nodes of a given path.

Optionally, and when necessary so, (e.g. in a case of clocks without PHY-based time stamping), clock controller can estimate queue-induced delay asymmetry using queue-size and link-rate indicative data obtained from the end node(s) in addition to such data obtained from the respective transit nodes.

It is further noted that clock controller can obtain data from a part of PTP paths in the network, thereby providing asymmetry compensation only to a part of slave clocks. Preferably, but not necessary so, clock controller can obtain data from all PTP paths.

Those versed in the art will readily appreciate that the teachings of the presently disclosed subject matter are not bound by the network architecture illustrated with reference to FIG. 1. Likewise, clock controller can operate in conjunction with SDN (Software Defined Network) controller or other management entity capable to provide management functions as described above. Clock controller can be operatively coupled to such management entity or, fully or partly, integrated therewith.

Figure 3:
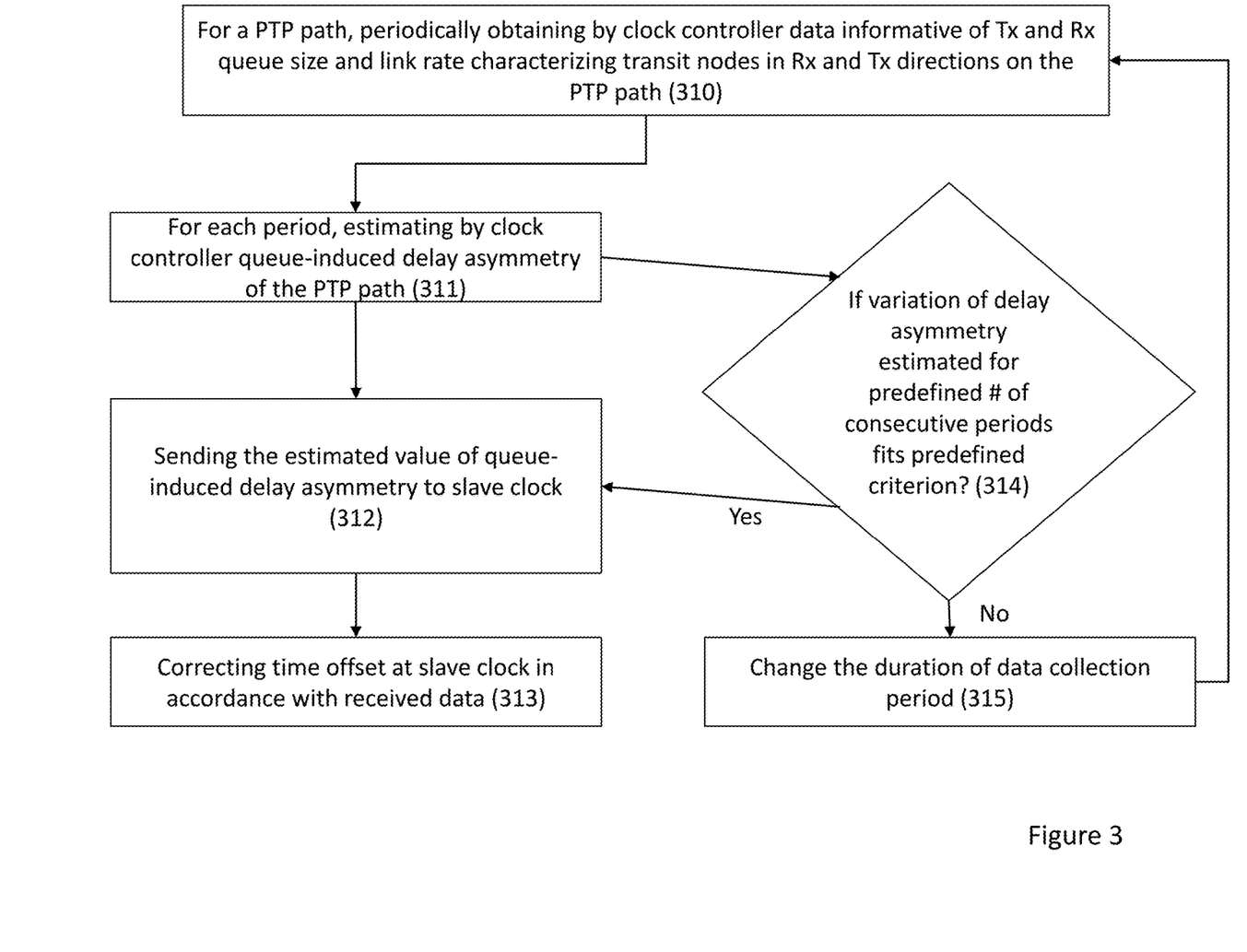
FIG. 3 illustrates a generalized flow chart of compensating queue-induced delay asymmetry in accordance with certain embodiments of the presently disclosed subject matter.

Referring to FIG. 3, there is illustrated a generalized flow chart of compensating queue-induced delay asymmetry in accordance with certain embodiments of the presently disclosed subject matter.

Clock controller 101 periodically obtains (310) data informative of queue size and link rate characterizing, during a collection period, at least part of transit nodes in master-slave (MS) and slave-master (SM) directions on at least one PTP path. It is noted that, for a given node, queue size behavior can differ from behavior of data traffic load in respective link(s). By way of non-limiting example, in a case of improper traffic shaping, the queue size can grow even when the link is free for transmission.

By way of non-limiting example, clock controller can obtain topology information from NMS, and can be further configured to specify the PTP paths to be compensated and to specify destination and transit nodes therein to be used for obtaining respective data. Further, clock controller can obtain, in pull or push mode, queue-size and link-rate related data from NMS. NMS can be configured to periodically poll the nodes for such data and/or to request the respective data from the nodes responsive to requests received from clock controller 101.

For each collection period, clock controller estimates (311) queue-induced delay asymmetry of each PTP path, and sends (312) the obtained value to the respective slave clocks (e.g. via the NMS) to be used as asymmetry correction parameters. In certain embodiments of the currently disclosed subject matter, clock controller can send to each slave clock the value of queue-induced delay asymmetry respectively estimated at each collection period. Alternatively, clock controller can send the estimated value of queue-induced delay asymmetry in a selective manner By way of non-limiting example, clock controller can send the correction parameter only when the estimated queue-induced delay asymmetry exceeds a predefined threshold, and only to the respective slave clock(s). By way of alternative or additional non-limiting example, clock controller can, for each PTP path, compare queue-induced delay asymmetry values estimated to a given PTP path during a predefined number of collection periods, and, upon the predefined number of collection periods, can selectively send the correction parameters only to slave clocks with variations of estimated queue-induced delay asymmetry matching a predefined criterion.

Figure 4:
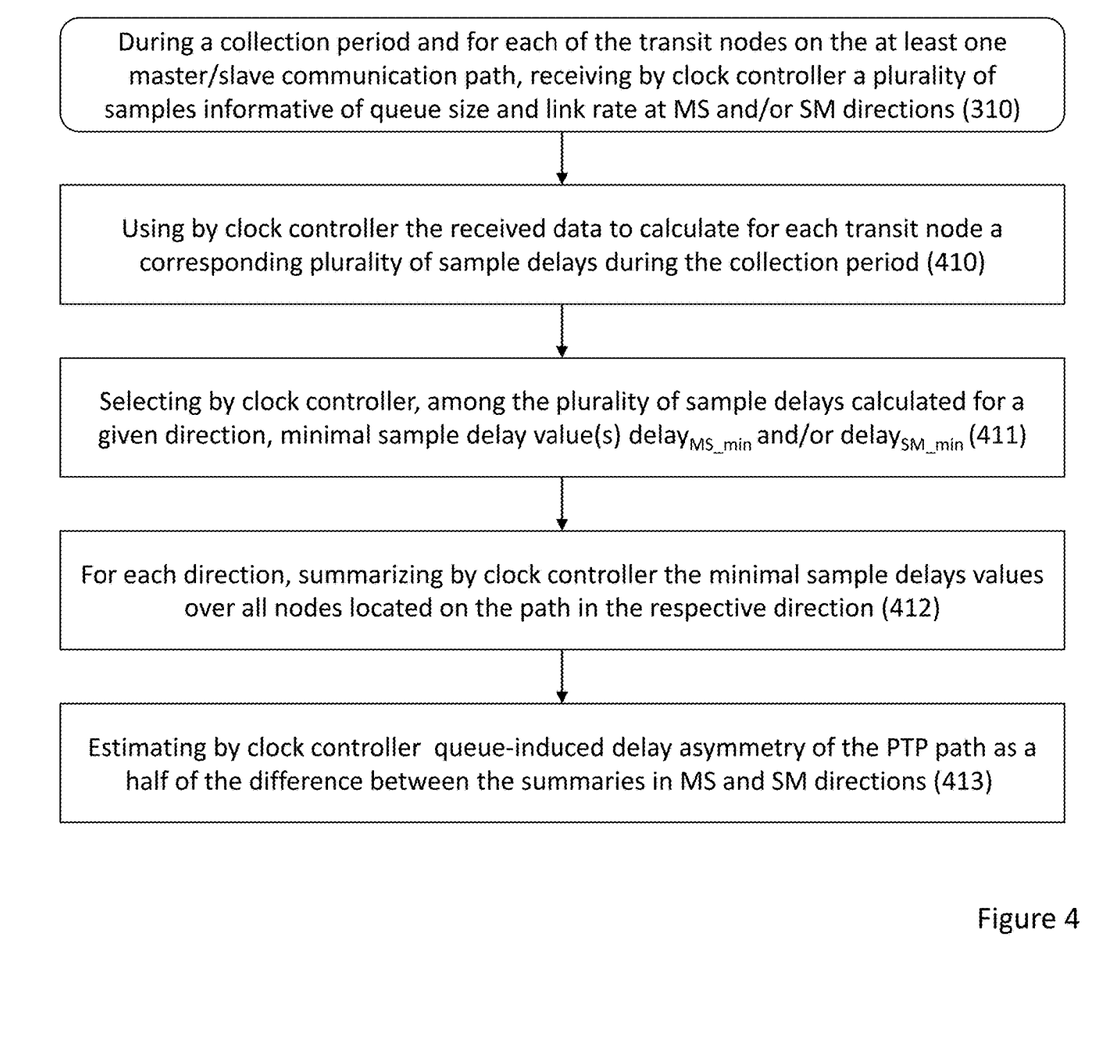
FIG. 4 illustrates a generalized flow chart of estimating queue-induced delay asymmetry in accordance with certain embodiments of the presently disclosed subject matter.

As illustrated by way of non-limiting example in FIG. 4, in order to estimate queue-induces delay asymmetry of a PTP path, clock controller receives, during each collection period and for at least part of the transit nodes on the PTP path, a plurality of samples, each informative of queue size and link rate at MS or SM directions of the respective nodes. For a given collection period, clock controller uses the samples received during the given period to calculate (410) for each transit node (of the above at least part of the transit nodes) a corresponding plurality of sample delays. A sample delay is calculated in accordance with following equations:

$$\text{Delay}_{MS} = \text{queue\_size}_{MS}/\text{link\_rate}_{MS} \text{ (for transit nodes located on the PTP path in master-to-slave (MS) direction);}$$

$$\text{Delay}_{SM} = \text{queue\_sizes}_{MS}/\text{link rate}_{SM} \text{ (for transit nodes located on the PTP path in slave-to-master (SM) direction).}$$

For each respective node, clock controller further selects (411), among the plurality of sample delays calculated for a given direction for the respective collection period, sample delay with minimal value $\text{delay}_{MS\_min}$ for master-to-slave direction and sample delay with minimal value $\text{delay}_{SM\_min}$ for slave-to-master direction. These selected sample delays calculated by the clock controller for a given transit node correspond to MS and SM delays induced by the given node to the "fastest" PTP event messages during the collection period, such fastest message usable by the PTP protocol.

For a given collection period and for each direction, clock controller summarizes the minimal delay values over all nodes (of the above at least part of the transit nodes) located on the PTP path in the respective direction (412) and estimates (413) queue-induced delay asymmetry of the PTP path as a half of the difference between the summaries obtained in MS and SM directions:

$$\text{Queue-induced delay asymmetry} = (\Sigma\,\text{delay}_{MS\_min} - \Sigma\,\text{delay}_{SM\_min})/2.$$

Referring back to FIG. 3, upon receiving the correction parameters (the estimated queue-induced delay asymmetry for the respective PTP path) from the clock controller, slave clock uses them to correct (313) the time offset.

For example, the provided value of queue-induced delay asymmetry can be used to update correction field as described in IEEE 1588 standard, part 11 (Clock offset, path delay, residence time, and asymmetry corrections). The standard also defines how to use the asymmetry correction parameters for each packet type.

Alternatively, the provided value of queue-induced delay asymmetry can be used by the clock for internal correction (e.g. a client of NTP protocol can use the received correction parameters to internally correct the clock).

The clock controller calculates (314) variation of queue-induced delay asymmetry estimated during predefined number of consecutive collection periods. If the variation does not fit a predefined criterion, clock controller changes (315) the duration of collection period accordingly. By way of non-limiting example, clock controller can decrease the collection period if the estimated variation exceeds a predefined maximal threshold (e.g. if the variation obtained during ten 60-second collection periods exceeds 1 μsec, duration of collection periods can be decreased to 10 seconds).

Figure 5:
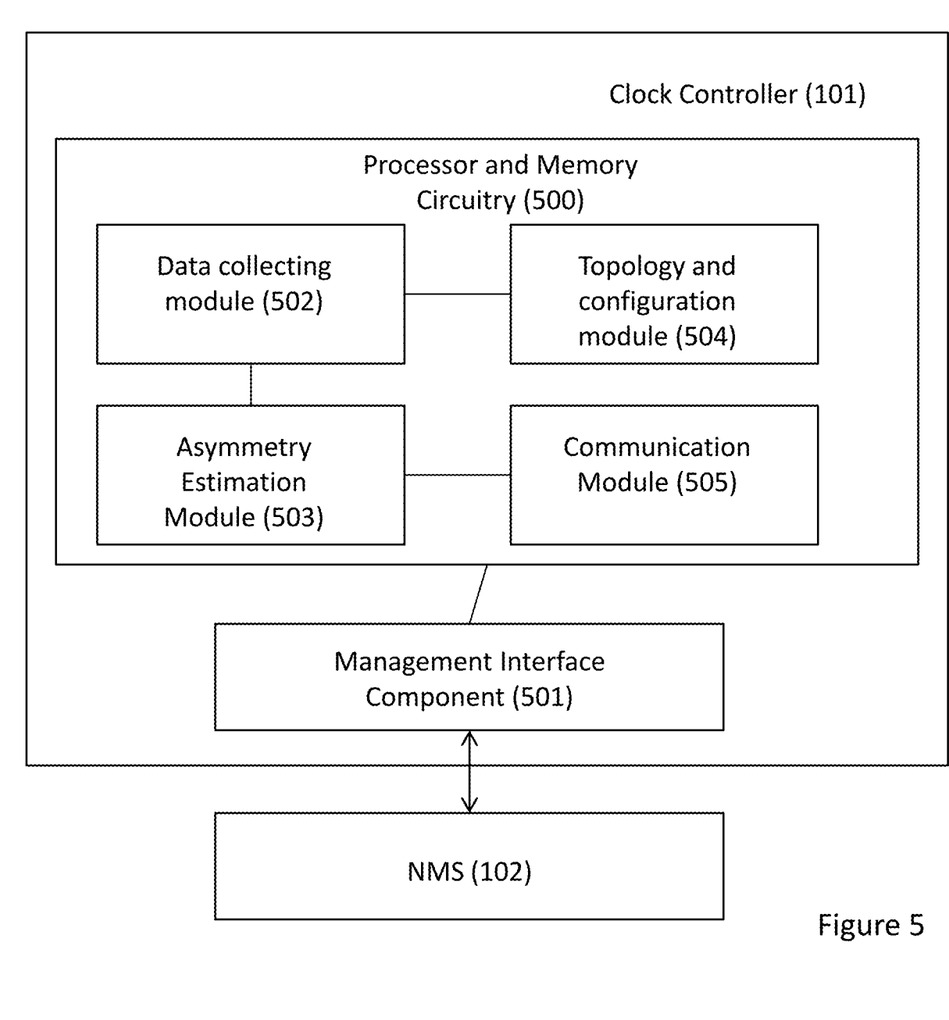
FIG. 5 illustrates a generalized block diagram of a clock controller in accordance with certain embodiments of the presently disclosed subject matter.

Referring to FIG. 5, there is illustrated a generalized block diagram of clock controller 101 implemented as a stand-alone entity operating in conjunction with NMS 102. Clock controller 101 comprises processor and memory circuitry 500 operatively connected to management interface component 501. Management interface component 501 is a hardware-based component configured to enable data communication with NMS 102 (e.g. via REST API).

Processor in the circuitry 500 can be configured to execute several functional components in accordance with computer-readable instructions implemented in the memory of the circuitry 500. Such functional components are referred to hereinafter as functional modules comprised in the processor and memory circuitry 500. The processor and memory circuitry 500 can comprise operatively connected data collecting module 502, asymmetry estimation module 503, topology and configuration module 504 and communication module 505.

Topology and configuration module 504 is configured to receive from NMS data indicative of PTP paths to be monitored and compensated, and nodes therein. Optionally, clock controller can be configured to monitor all PTP paths comprising nodes with available queue-size and link-rate related information. Alternatively, a user can configure PTP paths of interest via GUI operatively connected to NMS and/or clock controller.

Data collection module 502 is configured to obtain queue-size and link-rate related data as detailed with reference to FIG. 3. Asymmetry estimation module 503 is configured to calculate queue-induced delay asymmetry (e.g. in a manner detailed with reference to FIG. 4), and communication module 504 is configured to generate messages to be sent to respective slave nodes via management interface component 501. The messages comprise queue-induced delay asymmetry correction parameters to be used by slave clocks for clock correction.

Those versed in the art will readily appreciate that the teachings of the presently disclosed subject matter are not bound by clock controller illustrated in FIG. 5; equivalent and/or modified functionality can be consolidated or divided in another manner and can be implemented in any appropriate combination of software with firmware and/or hardware. Likewise, clock controller can operate in conjunction with SDN (Software Defined Network) controller or other suitable management entity and can be fully or partly integrated with a management entity or other network entity.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

It will also be understood that the system according to the invention can be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of clock managing in a packet data network (PDN) implementing a time-transfer protocol, the network comprising a plurality of nodes and a computer-based clock controller operatively connected to at least part of the nodes, the method comprising:

upon obtaining, by the clock controller, topology data informative of a master clock node and a slave clock node constituting end points of a PTP path in the PDN and further informative of at least part of transit nodes of said PTP path, periodically obtaining by the clock controller data informative of queue size and link rate characterizing, during a collection period, the at least part of transit nodes in master-slave (MS) and slave-master (SM) directions, thereby giving rise to queue-related data;

for each collection period, using the obtained queue-related data to estimate, by the clock controller, queue-induced delay asymmetry of the PTP path, wherein estimating queue-induced delay asymmetry for a given collection period comprises:

for each node of the at least part of transit nodes, processing a plurality of samples informative of queue size and link rate at MS and/or SM directions and received during the collection period, thereby calculating a corresponding plurality of sample delays in MS and/or SM directions;

for each node of the at least part of transit nodes, selecting, among the plurality of sample delays calculated for a given direction, minimal sample delay values;

summarizing the minimal sample delay values over all nodes, of the at least part of transit nodes, located on the PTP path in MS direction and summarizing the minimal sample delay values over all nodes, of the at least part of transit nodes, located on the PTP path in SM direction; and estimating queue-induced delay asymmetry of the PTP path as a half of the difference between the summaries of minimal sample delay values obtained in MS and SM directions; and sending by the clock controller the estimated value of queue-induced delay asymmetry to the slave node, the estimated value to be used by a clock residing on the slave node as delay asymmetry correction parameter.

2. The method of claim 1, wherein, for a transit nodes located on the PTP path in a given direction, a sample delay is calculated as a ratio between respectively sampled queue size and link rate in the given direction.

3. The method of claim 1, wherein the clock controller sends to the slave node the values of queue-induced delay asymmetry estimated in each of the collection periods.

4. The method of claim 1, wherein the clock controller sends to the slave node only estimated values of queue-induced delay asymmetry which exceed a predefined threshold.

5. The method of claim 1, wherein at least one node of the at least part of transit nodes located on the PTP path in the MS direction is not located on the PTP path in the SM direction.

6. The method of claim 1, wherein the clock controller obtains the topology data from a network management system or SDN (Software Defined Network) controller operatively connected to the nodes and to the clock controller.

7. The method of claim 1, wherein the clock controller obtains the queue-related data from a network management system or SDN controller operatively connected to the nodes and to the clock controller.

8. The method of claim 1, wherein the time transfer protocol is PTP (Precision Time Protocol) or NTP (Network Time Protocol).

9. The method of claim 1, wherein the clock controller calculates variation of values of queue-induced delay asymmetry estimated during a predefined number of consecutive collection periods, and changes the duration of collection if the variation does not fit a predefined criterion.

10. A clock controller configured to operate in a packet data network (PDN) comprising a plurality of nodes and implementing a time-transfer protocol, the clock controller operatively connectable to at least part of the nodes of the plurality of nodes, the clock controller comprising a processor and memory circuitry (PMC) operatively connected to an interface component, wherein the PMC is configured to:

upon obtaining topology data informative of a master clock node and a slave clock node constituting end points of a PTP path in the PDN and further informative of at least part of transit nodes of said PTP path, periodically obtain via the interface component data informative of queue size and link rate characterizing, during a collection period, the at least part of transit nodes in master-slave (MS) and slave-master (SM) directions, thereby giving rise to queue-related data;

for each collection period, use the obtained queue-related data to estimate queue-induced delay asymmetry of the PTP path wherein, for a collection period, estimating queue-induced delay asymmetry is configured to comprise:

for each node of the at least part of transit nodes, processing a plurality of samples informative of queue size and link rate at MS and/or SM directions and received during the collection period, thereby calculating a corresponding plurality of sample delays in MS and/or SM directions;

for each node of the at least part of transit nodes, selecting, among the plurality of sample delays calculated for a given direction, minimal sample delay values;

summarizing the minimal sample delay values over all nodes, of the at least part of transit nodes, located on the PTP path in MS direction and summarizing the minimal sample delay values over all nodes, of the at least part of transit nodes, located on the PTP path in SM direction; and estimating queue-induced delay asymmetry of the PTP path as a half of the difference between the summaries of minimal sample delay values obtained in MS and SM directions; and send the estimated value of queue-induced delay asymmetry to the slave node, the estimated value to be used by a clock residing on the slave node as delay asymmetry correction parameter.

11. The clock controller of claim 10, wherein, for a transit nodes located on the PTP path in a given direction, a sample delay is calculated as a ratio between respectively sampled queue size and link rate in the given direction.

12. The clock controller of claim 10, wherein the PMC is configured to send to the slave node the values of queue-induced delay asymmetry estimated in each of the collection periods.

13. The clock controller of claim 10, wherein the PMC is configured to send to the slave node only estimated values of queue-induced delay asymmetry which exceed a predefined threshold.

14. The clock controller of claim 10, wherein the PMC is configured to obtain the queue-related data from a network management system or SDN controller operatively connected to the nodes and to the clock controller.

15. The clock controller of claim 10, wherein the PMC is configured to calculate variation of values of queue-induced delay asymmetry estimated during a predefined number of consecutive collection periods, and change the duration of collection if the variation does not fit a predefined criterion.

16. A computer program product implemented on a non-transitory computer usable medium and comprising computer readable program code for performing all the method stages of claim 1.

* * * * *